Figure 5:
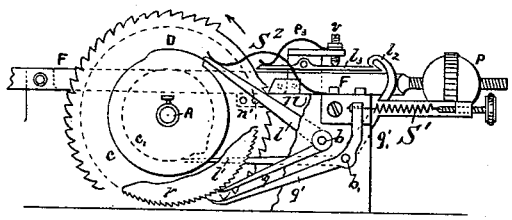

(No Model.) 2 Sheets—Sheet 1.
E. MEYLAN & W. C. RECKNIEWSKI.
ELECTRIC METER.
No. 457,453. Patented Aug. 11, 1891.
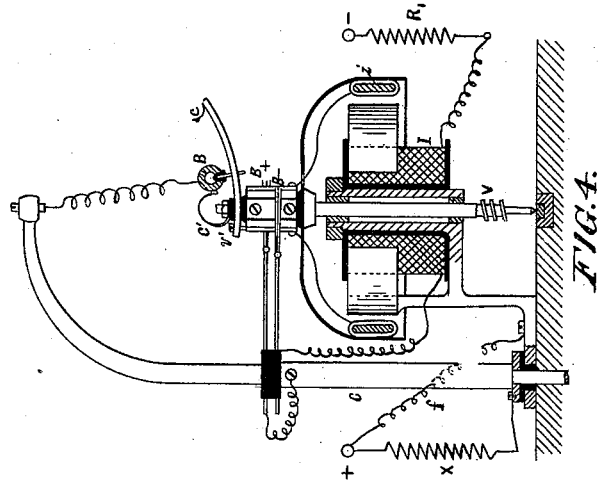
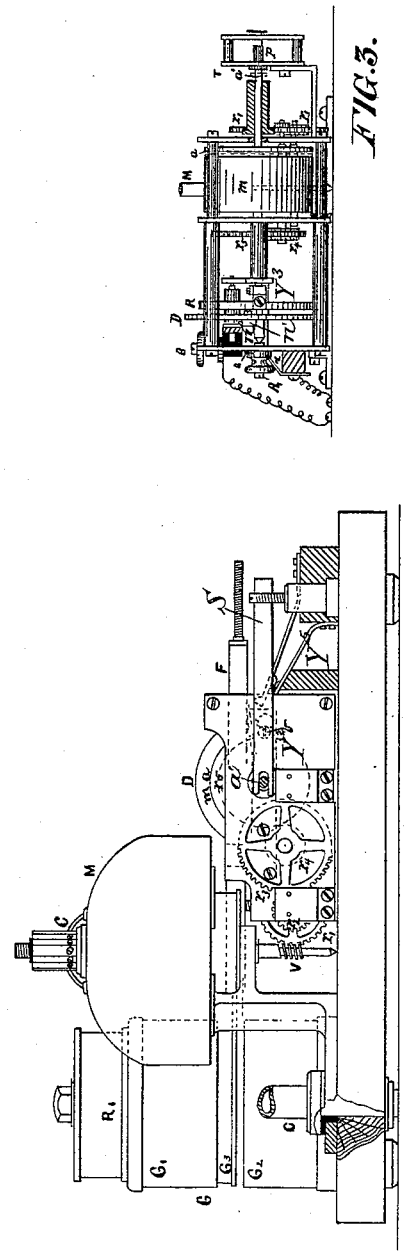
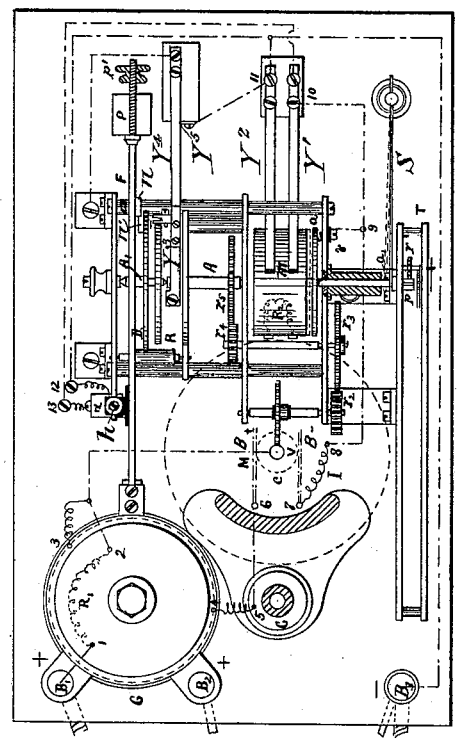
WITNESSES:
Chas. A. Ritter.
L. d'Aurea
INVENTORS
Eugene Meylan
Wenceslas Camille Reckniewski (No Model.)
2 Sheets—Sheet 2.

E. MEYLAN & W. C. RECKNIEWSKI.
ELECTRIC METER.

No. 457,453. Patented Aug. 11, 1891.

WITNESSES:

INVENTORS

UNITED STATES PATENT OFFICE.

EUGENE MEYLAN AND WENCESLAS CAMILLE RECKNIEWSKI, OF PARIS, FRANCE, ASSIGNORS TO RÉNÉ HEURTEY, OF SAME PLACE.

ELECTRIC METER.

SPECIFICATION forming part of Letters Patent No. 457,453, dated August 11, 1891.

Application filed November 10, 1890. Serial No. 370,931. (No model.) Patented in France February 6, 1890, No. 203,614; in England August 5, 1890, No. 12,209; in Belgium August 6, 1890, No. 68,714; in Germany August 6, 1890, No. 10,189; in Switzerland August 25, 1890, No. 2,825, and in Austria-Hungary December 30, 1890, No. 37,935.

*To all whom it may concern:*

Be it known that we, EUGENE MEYLAN and WENCESLAS CAMILLE RECKNIEWSKI, citizens of the Republic of France, residing at Paris, in the Republic of France, have invented certain new and useful Improvements in Electric Meters, (for which we have obtained the following patents, to wit: in France, No. 203,614, bearing date February 6, 1890; in England, No. 12,209, bearing date August 5, 1890; in Belgium, No. 68,714, bearing date August 6, 1890; in Germany, No. 10,189, bearing date August 6, 1890; in Austria-Hungary on December 30, 1890, No. 37,935, and in Switzerland, No. 2,825, bearing date August 25, 1890,) of which the following is a specification.

The present invention has for its object a new meter for electricity, to serve as a "Coulomb meter" or a "Watt meter," working as well with alternate as with continuous currents.

Our apparatus is constituted of the following arrangement of parts:

First. An electric or other motor of constant speed, imparting to a principal axis by gear-wheels a continuous and uniform rotary motion.

Second. An Ampère meter or Watt meter constituted of an electric balance, of which the movable part presses against a stop with a force proportional to the quantity to be measured.

Third. An "elastic cam" mounted on the principal axis and producing at each turn an increasing pressure upon the end of the balance-lever for the purpose of bringing back the balance into equilibrium without the intervention of the stop. When this weighing or automatic reading is effected, the cam escapes from the lever and regains its normal position, continuing to be actuated by the principal axis.

Fourth. A register and totalizer. By this combination it will be observed that in order to constitute a meter, in the ordinary sense, it suffices to put into relation by coupling devices, during the period of each weighing, the axis of the first wheel of the totalizer with the principal axis. In consequence the last part of our meter is—

Fifth. A clutch or coupling device which is capable of being disposed in a variety of dispositions, of which we give the description of the most important ones.

In the annexed drawings we represent a complete meter, as described above, as well as the details of the most important parts and their electrical connections.

Figure 6:
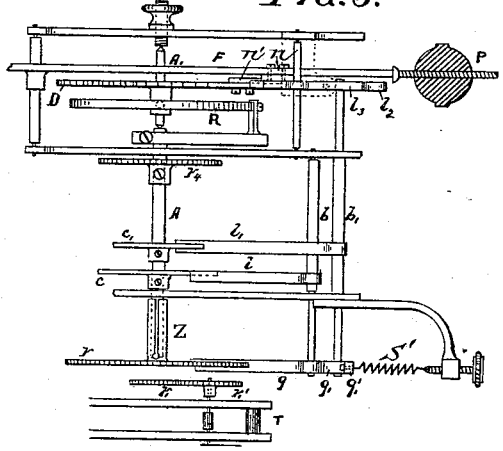
Figure 7:
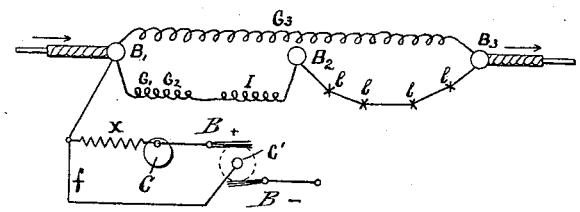

Figure 1 is an elevation of a meter. Fig. 2 is a plan. Fig. 3 is an end view. Fig. 4 is a view of motor with its regulator. Figs. 5 and 6 are details of a disposition of mechanical coupling devices. Fig. 7 is an arrangement of a meter for constant-current distributions.

In Figs. 1, 2, and 3, M indicates the electric motor of constant speed, which, by means of endless screw V and wheels $r'\ r^2\ r^3\ r^4\ r^5$, communicates to the principal axis A a uniform motion.

At one of the ends of A and in its prolongation is mounted the elastic cam, which consists of the axis A', of the disk D, carrying the cam $n'$, and of the spiral spring R. The latter is fixed on one side to the axis A' and on the other side to the finger $Y^3$, fastened to the axis A but regulable in angular position. The disk is carried on in the rotation of A so long as the cam $n'$ does not meet with the piece $n$ of the beam F of the electric balance, which necessarily happens at every turn. This balance is formed in the case here represented of a Watt meter, of a movable flat coil $G^3$, of fine wire, fastened to the pivoted beam F and counterweighted by the weights P and P', and of two fixed coils $G'$ and $G^2$, of insulated copper ribbon, which are in the circuit of the lamps and disposed in series or in parallel. For a Coulomb meter we employ a fixed solenoid and a movable solenoid with an iron divided or non-divided core which is attracted by the first and fastened to the beam F. In this case the exact proportion of force to current is obtained by the fact that the iron is saturated by a derived current. In both cases we obtain on a stop, which here is the coil $G'$, a force or pressure proportional to the quantity to be measured, I or E I, as is well understood. When the cam $n'$ encounters the piece $n$, the spring R is twisted until it develops a force sufficient to raise the beam F. At this moment the weighing is ended, the pieces $n'$ and $n$ escape, the spring distends, and the disk D returns to the position corresponding to no torsion.

In order to prevent any irregular motion of D in cases of great torsion, we place a friction-brake (not shown here) or employ the disposition hereinafter described to insure a dead-beat movement. The spring R is such that its torsional force is always proportional to the angular displacement. The duration of the pressure—viz., the time that elapses between the stroke of the lever F by the cam $n'$ and its elevation or the total torsion of the spring—is absolutely proportional to the initial pressure of the balance on its stop or to the quantity to be measured. It is consequently necessary to put in motion the totalizer during the periods of pressure—viz., to allow the totalizer to participate in the movement of the principal axis during these periods. To this end we employ, for example, an electro-magnetic disposition similar to those existing in certain electric chronographs. An electro-magnet $m$ is mounted on the prolongation of the axis A. Its armature $a$, retained by spring S, is affixed to the axis $a'$, which by pinion $p$ strikes the first wheel $r$ of totalizer T. This axis $a'$ can be moved backward and forward longitudinally. The exciting current of the electro-magnet $m$ being controlled by the spring-cam so as to excite the same during the process of each weighing, as will be seen, the totalizer therefore gives the quantities I or E I measured at equal intervals of time and adds these together, as is the case with all periodical and intermittent meters.

In the apparatus here represented the coupling is assured as follows: A single derived current is used for exciting the motor, the balance, and the magnetic coupler in series, and during the intervals of weighings the coupling ceases by the short-circuiting of the coil of the magnetic coupler. The derived current passes first through a rheostat R', then through the coil of fine wire $G^3$ (3 4) of the Watt meter, from which it passes normally into the armature of the motor by the insulated support C, carrying the brushes, and the conical pendulum serving as a regulator, as will be seen. One of these brushes B+ is connected electrically to this column, while the other B— is insulated from the same. From the armature the current passes in I into the magnet-coil of the motor, and from there, during the intervals of weighing, to the terminal $B^3$ by the wire 8 9, the screw $v$, the circular armature $a$, the body, the springs $Y^4$ and $Y^5$. Under those conditions the electro-magnet $m$ of the magnetic coupler is not excited, as its coil, which is connected to the contact-springs $Y'$ $Y^2$ by two insulated rings, is short-circuited by the screw $v$, the body, and the contacts $Y^4$ $Y^5$. At the moment when a weighing commences or when the torsion of the spring R brings into equilibrium the excess of the regulable counter-weights P and P', and when consequently that torsion begins to act against the electro-dynamic pressure the extremity of the finger $Y^3$ elevates the upper spring $Y^4$, and thus breaks the short circuit of the coil of $m$. The derived current then passes entirely into the coil $R^2$, the armature $a$ is attracted, and the setting-in gear commences, finishing when the weighing is ended and the spring raises the beam F. At that moment the two insulated contacts $x$ and $h$, one of which is fixed while the other acts in connection with the beam and which contacts are respectively connected to $Y'$ and $Y^2$, are about to come in contact, and consequently short-circuit again the coil $R^2$, the armature is brought back by the spring S and the in-gearing ceases; but as the contact of $x$ and $h$ lasts no more than an instant and ceases when the cam $n$ releases the part $n'$ and escapes the short circuit is maintained by the contact of the non-insulated armature $a$ against the insulated screw $v$. By this means there are two different short circuits, one, (wire 9, screw $v$ $a$, body $Y^4$ $Y^5$ 11,) which ceases momentarily in $Y^4$ $Y^5$ at the commencement of the weighing, then automatically and continuously in $v$ $a$ by the attraction of $a$, the other in $x$ $h$, having for its object the re-establishment of this short circuit by causing the return of the armature $a$. This disposition of coupling is very exact and suitable for large meters.

*Motor and speed regulator.*—The motor we use is, as represented in Fig. 4, a Gramme ring motor coiled in series and connected in series with a resistance X. The derived current first passes through a rheostat R', then by the inductor I in the armature $i$, and finally by the resistance X. One of the brushes B+ communicates with the body of the insulated column C and subsequently with the ball B of a conic pendulum-regulator, while the brush B— is insulated. The groove of the regulator is insulated from the body of the motor and is connected by the screw $v'$ to one of the collector-segments. It has at its extremity a contact $c$, thus connected electrically to one of the collector-segments. Finally the body of the motor is connected at the extremity of X by the wire $f$. For a certain speed the ball B leaves the contact $c'$, which is connected to the body of the motor, and, encountering contact $c$, causes a diminution of the torque of the motor. The current instead of passing entirely into the armature is derived from the same, partly by column C, ball B, contact $c$, and the collector-segment, which is in contact with this latter. When this segment is under B—, the entire current is derived from the armature. On the contrary, when this segment is under B+, the effect of the regulator is *nil*. The motor being properly constructed for a given current, this disposition insures a practically constant speed.

The resistance X, in series with the motor, and connected to the body of the motor by the wire $f$, has the effect of insuring a starting of the motor, as follows: In a state of repose and for all speeds below normal, the ball B touches the contact $c'$, which shunts the resistance X by establishing the circuit $f$, body $c'$, B, C, B+, $i$, B—, I, and R'. The derived current thus has a higher value than the normal, and the motor tends to accelerate. The motor is regulated so that the lower contact $c'$ serves only for the starting, and, in case of accident, so that the variation of the derived current resulting from the working of the regulator is insensible in consequence of the feeble resistance of the armature as compared to that of the whole of the derived circuit, which should be several thousands of ohms.

The connections indicated in Fig. 4 are in principle the same as those of the general plan of Fig. 2; but in Fig. 2 it is the coil itself of the Watt meter 3 4 which acts the part of resistance X. Besides, the rheostat R' is placed here before the motor. Finally it will be observed that the body of the motor is distinct from the general body of the apparatus, by the reason that the first wheel $r'$ is insulated from its axis.

The motor indicated in Figs. 1, 2, and 4 has a Gramme ring; but it is unnecessary to say that our system of regulator characterized by the short circuit of parts of the armature by the connections indicated and a centrifugal regulator can be applied to other forms of motors.

The coupling device above described is perfect in precision; but for practical purposes it is unnecessary to use so delicate an apparatus, and in certain cases (meters for a few lamps) we prefer to use a different coupling device, hereinafter described.

*Mechanical coupling devices.*—All electric contacts can be suppressed and the starting in and putting out of the totalizer effected by purely mechanical means. The system consists in principle in communicating the movement of the principal axis to the first wheel of the totalizer during the weighings by the intervention of a friction-clutch, which consists here in a ratchet-wheel mounted with smooth friction on the principal axis and controlled by two ratchets. The first of these ratchets sets free the ratchet-wheel at the commencement of the weighing and stops it at the end of the revolution. The second ratchet is at a distance from the wheel at the beginning of the weighings and drops in at the end of the weighings. It is again put out at the end of the revolution after the first has dropped in. The totalizer T is thus connected in a continuous manner to the principal axis A by a friction-gear, but only enters into the general motion during the periods of the weighings, since the two ratchets stop the movement of the friction-clutch during the intervals of the weighings. The totalizer T, Figs. 5 and 6, is connected to the axis A by the intervention of the wheel $r'$, which acts along with the ratchet-wheel $r$, which is itself mounted with smooth friction on the extremity of the axis A. The required pressure is obtained by a brass bush Z, which, being split, gives a spring on the axis A. The ratchet-wheel $r$ has two ratchets $q$ and $q'$, the first of which is always in contact before the beginning of the weighing, and is released at the moment that the same begins. The other is brought to bear at the precise moment the weighing ends. To this effect the first ratchet $q$, acting along with the axis $b$ and the lever $l$, is governed by the cam $c$, of which the profile and the angular position on A are such as to put the ratchet out of contact at the instant the weighing begins by means of pressure of the spring $S^2$, and to put it again into contact at the end of the turn. On the contrary, the ratchet $q'$ and its prolongation $q'$ act along with the axis $b'$ and the lever $l^2$, which is maintained in place against the action of spring S' by a tooth of lever $l^3$. When the weighing is finished, the cam $n'$ of the spring-cam escapes from part $n$ of F. At that moment, under the action of a previous torsion and the action corresponding to the electro-dynamic weighing itself, the disk D, which is fitted with projecting teeth, effects the elevation of the lever $l^3$, the lever $l^2$ escapes, and the ratchet $q'$ is immediately put into contact with $r$, under action of spring S'. At the end of the revolution a second cam $c'$, fixed also on axis A, by pressing on the lever $l'$, fixed on $b'$, effects the replacing of the ratchet $q'$ and the lever $l^2$ against the tension of the spring S'. This last operation is naturally only effected after the first ratchet $q$ has been replaced in contact by the cam $c$, so that the ratchet-wheel $r$ is only free during the weighings. The projecting teeth have, besides, the advantage of assuring a rapid stoppage of the disk D, which permits considerable twisting of spring R. The regulating of the apparatus is simply effected by making sure that the ratchet $q$ is set at liberty and the ratchet $q'$ put in gear simultaneously when the electro-dynamic pressure is *nil*. This regulation is operated by the fixing of the cam $c$ and the adjustment of weight P. The electrical connections in this case are as per Fig. 4, where the resistance X can represent the coil of fine wire of the Watt meter and R' a rheostat. The standardizing of all our apparatuses is such that the first dial-plate of the totalizer gives at once watts or multiples of watts by a judicious choice of spring R, then by adjustment of rheostat R', and finally by varying slightly the normal speed of motor by the addition of small shot in the ball of the regulator, as is well known. The above dispositions are suitable for meters of about one hundred and fifty lamps or less; but, as with all apparatus, the range is not indefinite. In the event of its being required to register all quantities between the unit (one lamp) and a much higher limit—five hundred lamps, for example—we employ a multiple system, as hereinafter described.

*Meter for constant-current distributions.*—
Our system is capable of being utilized to register the consumption on constant-current circuits, as is the case with arc lamps in series. It is only necessary to make the following modifications in the winding of the meter, and in the general connections, as is indicated in Fig. 7. The electro-magnet of the motor is wound with thick wire, and the coil I is inserted in series with the thick-wire coils $G'$ $G^2$ of the electric balance in the constant-current circuit, the resistances of these coils being in such relation to the strength of current that the fall of potential between $B'$ and $B^2$ will be always of 1.5 volt, for example. Our motor-armature is then so wound that it absorbs one volt, for example, and is inserted in series with a resistance X between $B'$ $B^2$, X being of such a magnitude that it absorbs 0.5 volt. This disposition assures the required constant-derived current of, say, 0.1 ampère, which is necessary, in this case, for setting the motor in rotation. The electrical regulator is the same in this case as is described in connection with Fig. 4. It suffices, consequently, to connect the fine-wire coil $G^3$ of the electrical balance to the terminal $B'$ $B^3$, and the meter will give the actual consumption of watts in the lamps $l$ $l$ $l$. For alternate currents it suffices to divide as much as possible the iron parts of the motor and magnetic coupler, or to replace the first by one of the well-known forms of alternating motors, which admits of the same principle of regulation.

Without in any way limiting ourselves to the details of execution, which may vary according to circumstances, we claim as our invention—

1. An electric meter consisting of an electric motor of constant speed, an electric balance, substantially as herein defined, an elastic cam, substantially as herein defined, a totalizer, as herein defined, and a coupling device adapted intermittently to impart the action of said motor to said totalizer under the operation of said cam, the whole adapted to effect automatically at regular intervals a record of current upon said totalizer.

2. In an electric meter, the combination of an electrically-connected centrifugal pendulum, as herein defined, with two electrical contacts therefor and connections thereto adapted one to increase the other to diminish the flow of current through said meter, substantially as specified.

3. In an electric meter, the combination of an elastic cam, as herein defined, mounted on an axis adapted to revolve at constant speed with an electric balance, as herein defined, substantially as specified.

4. In an electric meter, the combination of an electric motor of constant speed, an electric balance, substantially as herein defined, an elastic cam, substantially as herein defined, upon a shaft revolved by said motor, a totalizer, as herein defined, a friction-coupling device connecting said shaft with said totalizer, and mechanical devices, substantially as specified, adapted to be operated by said elastic cam and to release said friction-coupling.

5. The combination, with an electric meter, of an elastic cam, as herein defined, revolving on an axis at constant speed, a totalizer, as herein defined, a friction-coupling device connecting said axis and totalizer, and mechanical devices, substantially as described, adapted to be operated by said elastic cam and to hold and release said friction-coupling.

6. An electric meter consisting of an electric motor adapted to run at a constant speed, a shaft geared thereto, a totalizer adapted to be detachably connected to said shaft at each revolution thereof, and devices, substantially as specified, adapted to hold connection between said shaft and totalizer during a portion of the revolution of the shaft corresponding to the current passing and to be measured.

In testimony whereof we affix our signatures in presence of two witnesses.

EUGENE MEYLAN.
WENCESLAS CAMILLE RECKNIEWSKI.

Witnesses:
O. KERN,
ANDRÉ.